(No Model.) 2 Sheets—Sheet 1.

E. E. WHIPPLE.
HARROW.

No. 490,130. Patented Jan. 17, 1893.

WITNESSES:
E. C. Duffy
H. E. Peck

INVENTOR
E. E. Whipple
BY O. E. Duffy
ATTORNEY.

(No Model.) 2 Sheets—Sheet 2.

E. E. WHIPPLE.
HARROW.

No. 490,130. Patented Jan. 17, 1893.

WITNESSES:
E. C. Duffy
Chas. M. Werlé

INVENTOR
E. E. Whipple
BY O. E. Duffy
ATTORNEY.

UNITED STATES PATENT OFFICE.

EFFINGER E. WHIPPLE, OF ST. JOHN'S, MICHIGAN.

HARROW.

SPECIFICATION forming part of Letters Patent No. 490,130, dated January 17, 1893.

Application filed January 15, 1892. Serial No. 418,146. (No model.)

*To all whom it may concern:*

Be it known that I, EFFINGER E. WHIPPLE, of St. John's, in the county of Clinton and State of Michigan, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in harrows.

The object of the invention is to provide an improved harrow exceedingly simple, cheap and durable in construction, and so constructed and arranged as to be adapted for most varied uses and applicable to many conditions of soil.

A further object is to provide a harrow having teeth and knives provided with improved adjusting means.

A further object is to provide certain improvements in various features of construction and arrangements of parts whereby a highly efficient and greatly improved implement is provided with a great sphere of action.

The invention consists in certain novel features of construction and in combinations of parts more fully described hereinafter and particularly pointed out in the claims.

Figure 1:
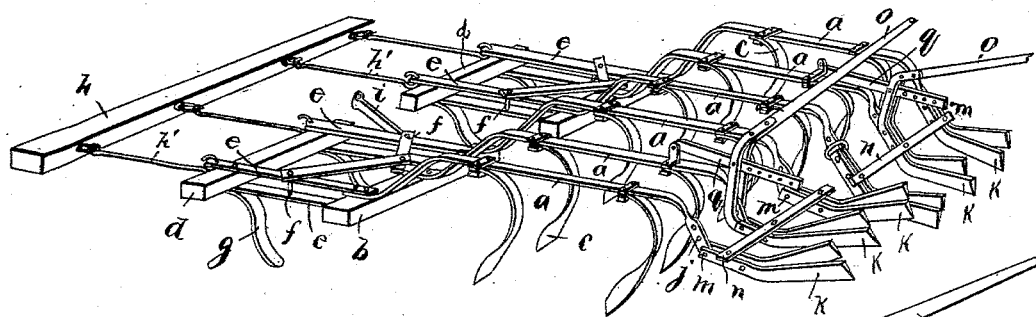
Figure 2:
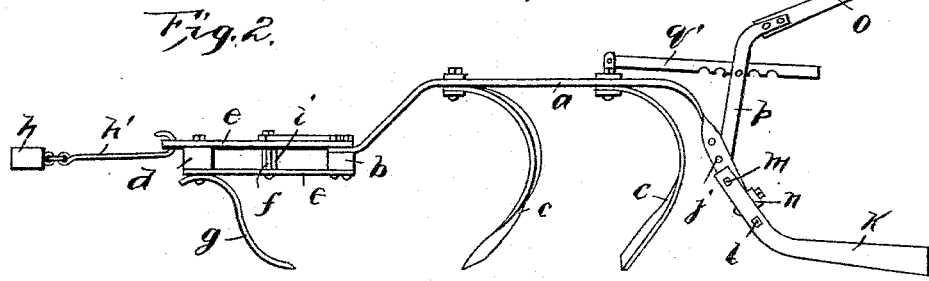
Figure 4:
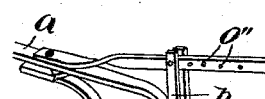
Figure 3:
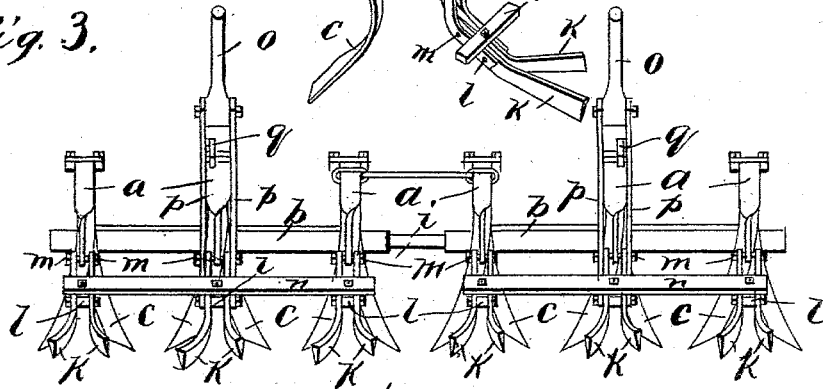
Figure 5:
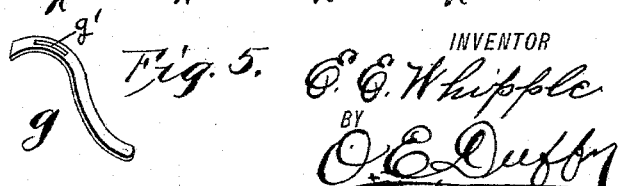
Figure 6:
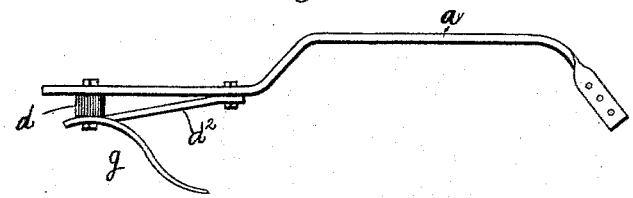
Figure 7:
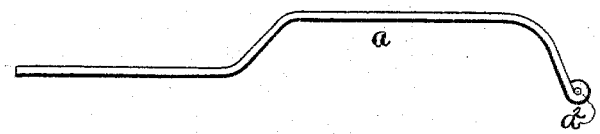
Figure 8:
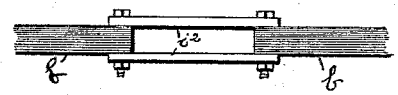
Figure 9:
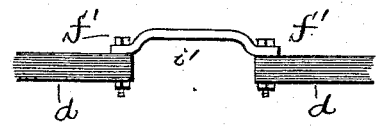

Referring to the accompanying drawings Figure 1, is a perspective view of the implement. Fig. 2, is a side elevation. Fig. 3, is a rear end view. Fig. 4, is a view showing a modified construction for adjusting the rear knives. Fig. 5, is a detail view of an adjusting shoe. Fig. 6, is an elevation of a modified form of forward extension of the harrow section. Fig. 7, is a view of a modified construction of tooth beam. Figs. 8, and 9, are views of modifications showing different forms of coupling and modes of attaching the same.

In the drawings reference letter $a$, indicates the tooth beams which are preferably formed of flat spring metal and extend parallel in the line of draft. These tooth beams are preferably arched as shown with their ends extended downwardly. The lower front ends of the tooth beams are suitably secured rigidly together as by horizontal beams $b$. The curved spring harrow teeth $c$, are secured to the tooth beams by suitable means. There are preferably two teeth secured to each beam with their lower ends inclined outwardly in opposite directions.

An extension is suitably formed forwardly from the beam $b$, and projects a distance in advance thereof and preferably consists of beam $d$, rigidly secured to beam $b$, by means of rigid links or connecting strips $e$, suitably braced and bolted to said beams. These strips $e$, are preferably metal links extending between the beams $b$, $d$, preferably each pair of links or strips $e$, has a removable vertical bolt $f$, passed therethrough.

The forward extension of the harrow section can be formed in different ways and I do not wish to limit myself to any particular construction. For instance the ends of the harrow beams can be extended forwardly as shown in Fig. 6, and secured directly to the forward beam $d$. Braces $d^2$, can be provided secured to under side of said beam and to the harrow beams somewhat as shown. The draft attachments are loosely secured to the beam $d$.

Adjustable curved gaging shoes $g$, are secured to the ends of beam $d$, at the front end corners of the forward extension from the tooth beams. These gaging shoes are rendered vertically adjustable by suitable means as by longitudinal slots $g'$, in their upper curved ends through which their clamping bolts extend. Their purpose will be more fully stated hereinafter.

Each harrow consists of a suitable number of sections. Two are here shown, although if desired, one section can be used alone. The sections when working level ground are ordinarily allowed to run independently of each other and are coupled together usually only by the doubletree $h$, loosely connected to the front beams $d$, of the sections. When the sections are to be used in hard lumpy ground or in rough uneven sod they are coupled together at their front ends by means of the rigid metal coupling link or bar $i$, having vertical end eyes through which the bolts $f$, at the adjacent sides of the front extensions of the sections pass. This link $i$, rigidly holds the sections and allows them limited play in the line of draft. The sections can be easily uncoupled by removing one of the bolts $f$, from the eye in the coupling link. Couplings can be made and attached in different ways, and I do not wish to limit myself to exactly what is here shown and described. For instance, as shown in Fig. 9, a stiff yoke $i'$, can be employed pivoted at its ends on the ends of the adjacent beams $d$, $d$, of the two adjacent sections by vertical removable bolts $f'$. Instead of this arrangement links $i^2$, $i^2$, as shown in Fig. 8, can be employed pivoted at their ends on upper and lower sides of the ends of beams $b$, $b$, of two adjacent sections. The couplings can be pivoted to beams $b$, or $d$, or the two sections can be united by pivoting the coupling bars to some other convenient part. The front ends of link $e$, are preferably extended beyond the beam $d$, and provided with eyes to receive the loose connections $h'$, to the doubletree $h$.

The rear end of each tooth beam is extended downwardly and rearwardly and in some cases is twisted substantially as shown so that its lower portion assumes an edge wise vertical position. The lower rear end of each beam is provided with a vertical series of horizontal transverse apertures $j$.

The rear end of the tooth beams can be formed in many ways and I do not wish to limit myself to the exact constructions here shown. For instance, as shown in Fig. 7, the rear end of the tooth beam can be bent down and rolled or turned up to form a transverse eye $a^2$, by which the knives can be pivoted.

The rear end of each tooth beam is provided with preferably two pulverizing, cutting and gaging knives $k$, sharpened at their lower edges and inclined laterally at their outer ends. One knife is preferably longer than the other and the knives are arranged substantially as shown. The knives are rigidly secured together at their upper portion by a bolt $i$, so that their upper ends are separated sufficiently to engage opposite sides of the end of the tooth beam, to which the ends of the pair of knives are pivoted by pivot bolt $m$, so that the knives can swing vertically. The pivotal and securing point of the knives can be vertically adjusted to raise and lower the knives for various purposes by removing the pivot bolt $m$, and placing it in a higher or lower aperture $j$. I do not limit myself however, to this specific manner of securing the knives. The several pairs of knives of each section are secured to swing vertically together by suitable means, as by a cross bar $n$, rigidly bolted to the knives near their upper ends. Each section is provided with an upwardly and rearwardly extending handle or lever $o$, for guiding the sections and for raising and lowering all the knives of the section together. Each handle preferably has two angle plates $p$, rigid with and extending from its ends on opposite sides of a tooth beam end and the upper ends of the two knives secured thereto, and are fulcrumed preferably on the pivot bolt $m$, and secured rigidly to the knives below the pivot so that the knives of the section all rise and lower with the lever. Suitable means can be provided to hold the lever in the desired position, such as link $q$, pivoted at its front end to a tooth beam with its free end having longitudinal perforations and passed between plates $p$, $p$, so that the lever and knives are secured at the desired position by passing a bolt through said plates and a hole of said link $q$. Instead of this link a pivoted latch $q'$, can be used having a series of edge notches to engage a bolt passing through said plates $p$, see Fig. 2. Various other devices might be employed for holding the knives and lever, and I do not limit myself to any peculiar specific construction or arrangement for this purpose.

Various constructions and arrangements of levers or handles can be employed for raising and lowering the knives. Instead of the arrangement just described a rearwardly extending handle $o$, can be employed at its front end rigidly secured or hinged to the upper side of a tooth beam, and between its ends provided with the series of apertures $o$, and the plates $p'$, at their upper ends are pivoted to the handle by means of a pivot bolt passed through any one of said apertures so that the knives are swung up when the outer end of handle is pressed down, and vice versa when it moves up. The handle is preferably formed as shown and the position of the knives is determined by the position of the pivotal point of plates $p$, on the handle, hence the knives can be held in any desired position by shifting this pivotal point.

The rear knives besides serving to pulverize and level the soil, and sod &c., also serve as shoes or gages for the rear end of the harrow. The front shoes $g$, gage the front end of the harrow and co-act with the knives in determining the working depth of the tooth. The working of the harrow and cutting depth and action can be greatly and easily varied by means of the shoes and knives. The knives can be quickly and easily adjusted together to vary their working depth or to vary the working depth of the teeth.

The many and great advantages of this invention are obvious to those skilled in the art.

The constructions illustrated are specifically described for clearness, but I do not limit myself to the constructions here shown, but consider myself entitled to all such changes and modifications as fall within the spirit and scope of my invention.

Having thus fully described my invention, what I claim as new and desire to secure by Letters Patent is:—

1. The harrow section provided with the rigid extension at the front end thereof extending forwardly of the teeth and of substantially the same width as the harrow section, the gaging shoes carried by the front end of the section and gaging means at the rear end of the section substantially as described.

2. In combination two (or more) harrow sections, each section provided with a rigid forward extension of substantially the same width as the section, each extension having the corner gaging shoes at its front end and means detachably coupling the sections together, substantially as described.

3. The harrow having the rigid forward extension from the tooth beams thereof, the extension having the front transverse beam, the gaging shoes secured to the opposite ends of said beam, substantially as described.

4. The combination of two harrow sections, each having a rigid forward extension of substantially the same width as the section, and provided with the front gaging shoes, the rigid coupling bar at its opposite ends respectively pivoted to the extensions of said harrow sections respectively, substantially as described.

5. A harrow section having its tooth beams extending in the line of draft, a forward extension of said section of substantially the same width as the sections and in advance of the teeth, the gaging shoes carried by the front end of said extension, and the gaging and leveling knives carried by the rear ends of said beams, substantially as described.

6. The combination of two parallel harrow sections each having a rigid forward extension provided with gaging means, vertical removable pivot bolts mounted near the edges of said extension, and the rigid coupling having vertical end eyes arranged to receive said bolts and act as set forth.

7. A harrow section having its tooth beams extending in the line of draft, in combination with the gaging and leveling knives at their forward ends pivoted directly to the rear ends of the beams, a cross bar securing said knives to swing in unison and a lever to raise said knives, substantially as described.

8. In a harrow, the combination of gaging means at the front end of the harrow, the series of downwardly and rearwardly traveling and gaging knives at the rear end of the harrow, each knife being pivoted at its front end to permit its free end to swing vertically, the knives being secured together and means, substantially as described to hold the series of knives in the desired vertical adjustment, substantially as described.

9. A harrow provided with a series of vertically swinging knives pivoted at their front ends, a cross-bar secured on the knives and connecting them to swing in unison, a handle secured to the knives to raise and lower them, and a lock or latch to hold the lever and knives in the desired vertical adjustment, substantially as described.

10. In a harrow, the combination of the harrow beams, each beam having a pair of vertically adjustable knives pivoted to its rear end so that the rear ends of the knives can swing vertically, the knives being secured together to swing in unison, and the lever or handle connecting said knives to swing them, and provided with means for holding them in the desired position.

11. In combination, the harrow beams carrying the harrow teeth and having their rear ends provided with apertures, the downwardly and rearwardly extending knives pivoted to the rear end of each by means of its aperture, all the knives of the sections being connected together to swing in unison, and a lever or handle provided with plates extending down on both sides of the beam, and knives, and rigidly secured to the knives to swing therewith, and provided with means for holding them in position.

12. In a harrow, a tooth beam having its rear end bent down and twisted as described, and provided with vertical series of apertures, in combination with the knives pivoted to said beams in vertical adjustment by said apertures and pivots, substantially as described.

In testimony that I claim the foregoing as my own I affix my signature in presence of two witnesses.

EFFINGER E. WHIPPLE.

Witnesses:
CHARLES A. BLANCHARD,
M. D. HUBBARD.